(12) United States Patent
Moran et al.

(10) Patent No.: US 7,674,489 B2
(45) Date of Patent: Mar. 9, 2010

(54) FRESH CHEESE PRODUCTS CONTAINING BIOGENERATED FLAVOR COMPONENTS AND METHODS FOR PRODUCING

(75) Inventors: James W. Moran, Antioch, IL (US); Chad Galer, Glenview, IL (US); Mary C. Doyle, Chicago, IL (US); Benjamin Dias, Chicago, IL (US); Leslie Kopko, Chicago, IL (US); Paul Gass, Glenview, IL (US); Hermann Eibel, Freising (DE); Ludmilla Gimelfarb, Highland Park, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1195 days.

(21) Appl. No.: 11/241,645

(22) Filed: Sep. 30, 2005

(65) Prior Publication Data

US 2007/0077332 A1    Apr. 5, 2007

(51) Int. Cl.
A23C 19/076    (2006.01)
(52) U.S. Cl. .............. 426/36; 426/39; 426/43; 426/519; 426/522
(58) Field of Classification Search ............. 426/36, 426/39, 43, 512, 522
See application file for complete search history.

(56) References Cited

U.S. PATENT DOCUMENTS

| | | | |
|---|---|---|---|
| 3,048,490 A | 8/1962 | Lundstedt | |
| 3,840,672 A * | 10/1974 | Kasik et al. | 426/36 |
| 4,191,782 A * | 3/1980 | Vedamuthu | 426/38 |
| 4,708,876 A | 11/1987 | Yokoyama et al. | |
| 5,079,024 A | 1/1992 | Crane | |
| 5,108,766 A * | 4/1992 | Gelinas et al. | 426/43 |
| 5,180,604 A | 1/1993 | Crane et al. | |
| 5,180,773 A | 1/1993 | Dalibor | |
| 5,252,352 A | 10/1993 | Banach et al. | |
| 5,462,755 A | 10/1995 | Mehnert | |
| 5,643,621 A | 7/1997 | Mehnert | |
| 5,676,984 A * | 10/1997 | Bohanan et al. | 426/34 |
| 6,036,979 A | 3/2000 | Hormann et al. | |
| 6,214,586 B1 | 4/2001 | McNeilly | |

(Continued)

FOREIGN PATENT DOCUMENTS

DE    3444282 A1    6/1986

(Continued)

OTHER PUBLICATIONS

Belitz and Grosch, Food Chemistry Second Edition, 1999, Published by Springer, p. 508.*

(Continued)

*Primary Examiner*—C. Sayala
*Assistant Examiner*—Jenna A Watts
(74) *Attorney, Agent, or Firm*—Fitch, Even, Tabin & Flannery

(57) ABSTRACT

The invention provides for the manufacture of cheese products enhanced with a natural, biogenerated flavoring system. The natural flavoring system described herein may be used with various types of cheese and dairy products. In one embodiment, the system may be used in the production of flavor enhanced fresh cheese or cream cheese. In another embodiment, the system may be used in the production of low-fat cheese products, such as low-fat cream cheese.

11 Claims, 3 Drawing Sheets

U.S. PATENT DOCUMENTS

| | | | |
|---|---|---|---|
| 6,322,841 | B1 | 11/2001 | Jackson et al. |
| 6,406,724 | B1 | 6/2002 | Reddy et al. |
| 6,406,736 | B1 | 6/2002 | Han |
| 6,416,797 | B1 | 7/2002 | Han et al. |
| 6,419,975 | B1 | 7/2002 | Han et al. |
| 6,461,841 | B2 | 10/2002 | Geueke et al. |
| 6,558,716 | B1 | 5/2003 | Kent et al. |
| 6,562,383 | B1 | 5/2003 | Moran et al. |
| 6,586,025 | B2 | 7/2003 | Yvon et al. |
| 6,649,199 | B2 | 11/2003 | Bigret |
| 6,649,200 | B2 | 11/2003 | Smith et al. |
| 6,689,402 | B1 | 2/2004 | Nauth et al. |
| 2004/0151803 | A1 | 8/2004 | Wolfschoon-Pombo et al. |

FOREIGN PATENT DOCUMENTS

| | | |
|---|---|---|
| EP | 0144274 A1 | 6/1985 |
| EP | 0244009 A2 | 11/1987 |
| EP | 0247646 A1 | 12/1987 |
| EP | 0478036 A2 | 4/1992 |
| EP | 1186244 A2 | 3/2002 |
| EP | 1201134 A2 | 5/2002 |
| EP | 1356737 A2 | 10/2003 |
| FR | 2125434 A | 9/1972 |
| WO | 96/37114 A1 | 11/1996 |

OTHER PUBLICATIONS

Hui and Khachatourians Ed., Food Biotechnology Microorganisms, 1995, VCH Publishers, Inc, pp. 47-48, 76-78 and 645-646.*

* cited by examiner

FRESH CHEESE PRODUCTS CONTAINING BIOGENERATED FLAVOR COMPONENTS AND METHODS FOR PRODUCING

FIELD OF THE INVENTION

The present invention relates generally to cheese flavor compositions, fresh cheese products, and particularly, low-fat fresh cheese products, having desired flavor profiles. Processes for making and using the cheese flavor compositions also are provided.

BACKGROUND

Natural cheese traditionally is made by developing acidity in milk and setting the milk with a clotting agent, such as rennet, or by developing acidity to the isoelectric point of the protein. The set milk is cut and whey is separated from the curd. The curd may be pressed to provide a cheese block. Curing typically takes place over a lengthy period of time under controlled conditions. Cheddar cheese, for example, is often cured for a number of months or even longer, to obtain the full flavor desired.

Numerous reports have been published implicating several compounds to be important in the development of cheese flavor in cheese products. The main classes of compounds thought to contribute to flavor generation in cheese include amino acids, peptides, carbonyl compounds, fatty acids, and sulfur compounds. Urbach, G., "Contribution of Lactic Acid Bacteria to Flavor Compound Formation in Dairy Products," Int'l Dairy J., 1995, 3:389-422. Several volatile compounds including fatty acids, esters, aldehydes, alcohols, ketones, and sulfur compounds are included in lists describing the aroma of various cheeses. Production of several of these aroma and flavor compounds have been attributed to multiple enzymatic reactions and/or chemical reactions that take place in a sequential manner in ripening cheese.

Various microorganisms have been identified and selected for their ability to produce particular flavors in a cheese-ripening environment. These flavors arise through a series of enzymatic steps. For example, in cheese, degradation of proteins by proteases and peptidases can lead to the production of peptides and free amino acids. These precursors are shuttled through subsequent enzymatic reactions resulting in the formation of flavor compounds. An understanding of these reactions helps in the creation of flavors of a desired cheese type. Fox, P., Cheese: *Chemistry, Physics and Microbiology*, pp. 389-483, 1993.

The role of amino acid catabolism in the development of cheese aroma and flavor has been identified to be a rate limiting step in the development of cheese flavors. Yvon et al., "Cheese flavour formation by amino acid catabolism," Int. Dairy J. 11 (2001) 185-201. α-Keto acids are generally recognized as a key intermediate in the metabolism and interconversion of amino acids. Some of the main pathways identified in lactic acid bacteria include transamination reactions catalyzed by aminotransferases. They are responsible for the deamination of amino acids and formation of keto acids. A disadvantage with the aminotransferase enzyme is that it requires the presence of an amino group acceptor, which is limiting in the cheese matrix and needs to be supplemented to enhance transamination. According to the literature, the creation of aroma compounds and cheese flavor is greatly enhanced with the addition of α-ketoglutarate, an amino group acceptor. Yvon et al., "Adding α-Ketoglutarate to Semi-hard Cheese Curd Highly Enhances the Conversion of Amino Acids to Aroma Compounds," Int. Dairy J. 8 (1998) 889-898.

The literature also describes acceleration of the development of flavor compounds by the exogenous addition of enzymes and cell extracts (e.g., U.S. Pat. No. 6,649,199), and by the supplementation of a cheese matrix with intermediates of amino acid catabolism (e.g., U.S. Pat. No. 6,586,025; Banks et al., "Enhancement of amino acid catabolism in Cheddar cheese using α-ketoglutarate . . . ," Int. Dairy J. 11 (2001) 235-243).

According to at least one literature reference, D-amino acid oxidase is a flavoprotein which deaminates D-amino acids to the corresponding α-keto acids, ammonia, and hydrogen peroxide ($H_2O_2$) in the presence of molecular oxygen; the resulting hydrogen peroxide is degraded into water and molecular oxygen in the presence of catalase whereby keto acids remain as the final product. Upadhya et al., "D-Amino Acid oxidase and catalase of detergent permeabilized Rhodotorula gracilus cells and its potential use for the synthesis of α-keto acids," Process Biochem., 35 (1999) 7-13. U.S. Pat. No. 6,461,841 describes an isolated L-amino acid oxidase from Rhodococcus species encoded by a DNA molecule hybridizing to a particular nucleic acid sequence, which can be used for contacting an L-amino acid for the production of a keto acid. Neither of these last two-mentioned literature references refer to cheese microorganisms or a cheese-making environment involving such organisms. It has been reported that, although deamination of amino acids to α-keto acids might be catalyzed by either dehydrogenases or oxidases, such activities towards aromatic and branched-chain amino acids and methionine have never previously been detected in cheese microorganisms. Yvon et al., "Cheese flavour formation by amino acid catabolism," Int. Dairy J. 11 (2001) 185-201, 189-190.

Cheese manufacturers are interested in developing cheese products requiring less storage time before they are ripe enough for commercial distribution. Cheese makers have used a wide variety of different techniques in efforts to accelerate the cheese curing or ripening process. U.S. Pat. No. 6,649,200 provides a summary of a number of these techniques used for accelerating ripening of hard block cheeses.

Another approach used to avoid lengthy cheese ripening periods has been to make a cultured cheese concentrate ("CCC") having more intense cheese flavor, and then use it as a cheese flavoring agent in another bulk material. CCC's have been manufactured that attain full cheese flavor development within a number of days instead of months. These CCC's are added to other bulk foods, such as process cheeses or snack foods, to impart or intensify a cheese flavor. Methods for the manufacture of such cheese-flavored concentrates have been described in U.S. Pat. No. 4,708,876. Typically the process involves a dairy substrate that is cultured with a lactic culture followed by addition of various proteases, peptidases, and lipases. U.S. Pat. No. 4,708,876 describes cheese flavored concentrates that can be obtained from milk as a starting material, instead of cheese curds, or without formation of whey by-product. U.S. Pat. No. 6,214,586 describes use of live cultures having high levels of proteolytic enzymes and peptidolytic enzymes to debitter enzymatic modified cultures (EMC's).

Methods of cream cheese manufacture have been previously described in publications such as by Kosikowski and Mistry in *Cheese and Fermented Milk Foods*, $3^{rd}$ Ed.

Although these prior processes may produce an accelerated development, or an enhancement, of cheese flavor, they do not produce enhancements that target specific cheese flavor components. More recently a technology has been developed to produce a natural biogenerated cheese flavoring system that can be used to prepare different cheese products/derivatives, targeted at various cheese flavor profiles using a modular approach to flavor creation, which is described in, for example, U.S. Pat. No. 6,406,724. The cheese flavoring system described in this patent is derived from different components, wherein the individual components are combined in different ratios to provide specific flavor profiles in the cultured cheese concentrate products.

Despite the developments described in the above publications, a need still exists for alternative routes for making cheese flavoring systems, especially those produced via natural processes.

SUMMARY

The invention relates generally to biogenerated flavor compounds, cream cheese compositions containing biogenerated flavor compounds and processes of making such compounds.

In one embodiment, a process is provided for making a flavor compound, comprising heating a dairy product to a temperature in the range of 60 degrees Celsius (C.) to 140 degrees C. for an amount of time between 15 minutes and 24 hours to induce in-situ production of lactones. More specifically, the heating temperature may be about 84 to about 92 degrees C. and the heating time is about 55 to about 65 minutes, and more particularly, the heating temperature may be about 86 to about 90 degrees C. and the heating time is about 58 to about 62 minutes. The lactones produced may be any of g-hexalactone, g-octalactone, g-decalactone, g-dodecalactone, 6-dodecene-g-lactone, delta-hexalactone, delta-octalactone, delta-decalactone, delta-dodecalactone, and delta-tetradecalactone. In one embodiment the dairy product is a cream composition comprising concentrated milk fat and cream. Following the heating step, the heated dairy product is mixed with a salt citrate and a nitrogen source, providing a fermentation premix. In one embodiment the salt citrate is sodium citrate and the nitrogen source is yeast extract. The resulting premix is then fermented in the presence of lactose fermenting bacteria and flavor producing bacteria in a two phase fermentation cycle, wherein phase one is conducted without aeration and phase 2 is conducted with aeration. The lactose fermenting bacteria may be any of *Lactococcus cremoris* and *Lactococcus lactis*, and the like as well as combinations thereof. The flavor producing bacteria may be any of *Lactococcus lactis* spp. *diacetylactis* and *Leuconostoc cremoris*, and the like as well as combinations thereof.

In another embodiment of the invention, a milk concentrate having a lactose concentration less than about 2 percent is also added to the fermentation premix otherwise as generally described above, as part of the process of making the cream cheese product. The milk concentrate ingredient of the fermentation premix may be derived from any of skim milk and whole milk, or similar milk substrates. Preferably, the milk concentrate is a UF/DF retentate of skim or whole milk. The fermentation premix that includes the milk concentrate is then fermented in a manner as generally described above, i.e., in the presence of the lactose fermenting bacteria and the flavor producing bacteria in a two phase fermentation cycle, wherein phase one is conducted without aeration and phase two is conducted with aeration.

The invention additionally provides the low-fat cream cheese-like fermentation products obtained using the processes of the invention. The low-fat cream cheese-like fermentation products of the process embodiments are ready for immediate packaging and/or use, and do not require a separate curing or aging step for flavor development. The relatively low-fat cream cheese products of embodiments herein have flavor characteristics and profiles comparable to traditional higher fat content fresh cheese and cream cheese products.

DETAILED DESCRIPTION

The invention provides for the manufacture of cheese products enhanced with a natural flavoring system. The natural flavoring system described herein may be used with various types of cheese and dairy products. In one embodiment, the system may be used in the production of flavor enhanced fresh cheese or cream cheese. In another embodiment, the system may be used in the production of low-fat cheese products, such as low-fat cream cheese. Fat generally aids in retention of flavor in food products; therefore, in products where fat content has been reduced, flavor may be reduced. In one embodiment, to offset the potentially bland or mild flavor of low fat cream cheese products, biogenerated flavor compositions described herein may be added to a low fat cream cheese base to enhance the flavor therein.

Figure 1:
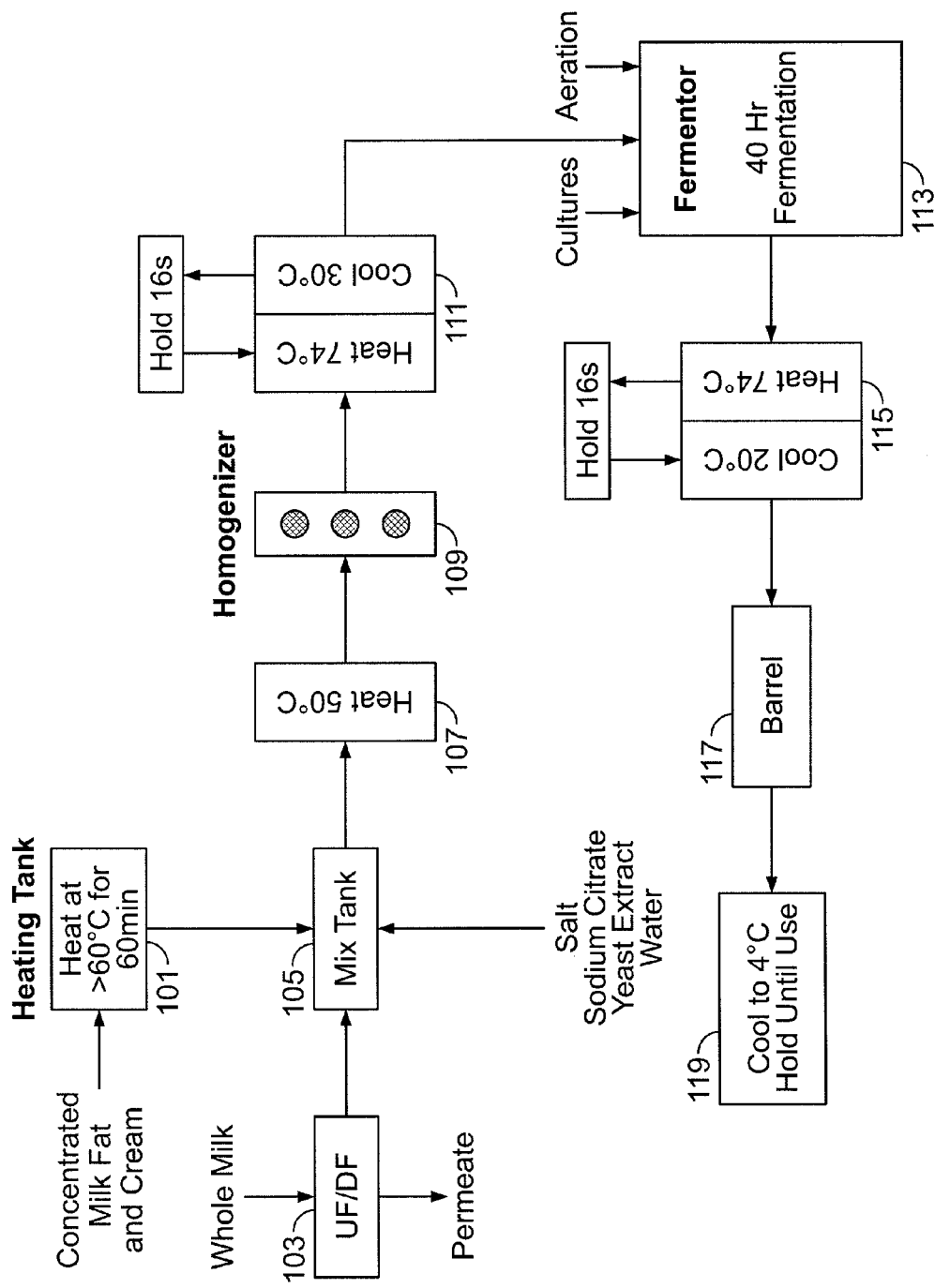
FIG. 1 provides a schematic flow diagram for a method of making a biogenerated flavor composition in accordance with an embodiment of the invention.

Turning to FIG. 1, an exemplary schematic flow diagram for a method of making a biogenerated flavor composition incorporating skim milk is provided. As shown in FIG. 1, at step 101 concentrated milk fat and cream are added to a heating tank, and their combination represents a dairy product. Inside the heating tank the concentrated milk fat and cream are heated to at least 60 degrees C. for at least 15 minutes, particularly about 84 to 92 degrees C. for about 55 to 65 minutes. In a preferred embodiment, the milk fat and cream are heated to about 88 degrees C. for about 60 minutes. This step is useful for producing thermally induced flavor compounds, such as, for example, various lactones, acetyls, and furans. A lactone is any cyclic ester which is the condensation product of an alcohol group and a carboxylic group in the same molecule. Lactones generally elicit a creamy flavor. Examples of lactones which may be produced include, but are not limited to, g-hexalactone, g-octalactone, g-decalactone, g-dodecalactone, 6-dodecene-g-lactone, delta-hexalactone, delta-octalactone, delta-decalactone, delta-dodecalactone, and delta-tetradecalactone. Examples of acetyls which may be produced include, but are not limited to, 2-acetyl thiazoline. Examples of furans which may be produced include, but are not limited to, 2-methyl-3-methyl thiolfurane. Depending on how many thermally induced flavor compounds are preferred, the heating temperature and time may be adjusted. For example, the range of useful temperatures is from about 60 degrees C. to about 140 degrees C. The range of useful heating time ranges from about 15 minutes to about 24 hours. There may also be additional factors considered when determining the optimal heating temperature and time such as types of manufacturing equipment used, desired processing time, and the like. In any case, any temperature or time useful for producing flavor compounds, such as lactones, is desired. The dairy product used a starting material in this process step may be a cream composition comprising a milk fat source (e.g., concentrated milk fat) and natural cream combined in respective amounts to provide a mixture containing about 40 to 60 percent fat, 30 to 60 percent moisture, 1 to 4 percent protein, and 1 to 5 percent lactose.

At step 103 skim milk is subjected to a membrane process, and preferably ultrafiltration and diafiltration, to separate milk fat, proteins, and other large biocomponents, as a retentate, from water and other smaller biocomponents (e.g., lactose, salts), as a permeate. In another embodiment, whole milk may be used in step 103. In yet another embodiment, any type of milk with any percent fat may be used such. For example, two percent milk may be used in step 103. Ultrafiltration and diafiltration are also particularly useful for controlling the amount of small biocomponents separated from the skim milk colloid. More specifically, lactose retention may be controlled through ultrafiltration and diafiltration (UF/DF). By controlling the amount of lactose retained in the retentate, the subsequent fermentation cycle can be controlled. It is desirable to control fermentation so microorganisms are directed to make desired flavor compounds such as diacetyl and acetoin. Although a UF/DF membrane process is preferred, it will be appreciated that various membrane techniques and equipment can be applied for providing the desired level of constituents in the retentate. The retentate optionally can be dried and reconstituted with water prior to further use in the inventive process. Drying may be effected by various means, such as spray drying, provided that reconstitutability is not affected.

In one example, the starting concentration of lactose in skim milk is about 5 percent. The concentrating process is generally performed at a temperature of about 100 to 140 degrees Fahrenheit (F.), and more typically 120 to 130 degrees F. The baseline pressure of the filtering system is generally 6 to 60 pounds per square inch gauge (psig), and more typically 20 to 30 psig. The concentration process will run for a period of time dependent on a number of factors including volume of milk to be processed, size of the filter or membrane used, and design of the filtering system. Following controlled ultrafiltration and diafiltration, or similar concentration system, the lactose concentration is reduced to approximately 1.0 to 1.5 percent. Whole milk may be processed similar to skim milk as described above. The starting concentration of lactose in whole milk ranges from about 4 to 6 percent and is reduced to approximately 1.0 to 1.5 percent. In any case, regardless of the amount of milk fat contained in the milk subjected to ultrafiltration and diafiltration (e.g. 0 percent, 2 percent, 5 percent, etc.), the amount of lactose contained in the retentate should be between about 0.5 percent and about 2.0 percent. Other factors in determining ultrafiltration and diafiltration time include retention of various minerals and vitamins such as magnesium, manganese, and iron. In one embodiment, the skim milk or other milk substrate is treated by ultrafiltration and diafiltration to provide a retentate having about 15 to 30 percent solids, about 70 to 85 percent moisture, about 0.5 to 4 percent lactose, about 0.1 to 1.0 percent milk fat, about 10 to 20 percent protein, about 0.1 to 2.0 percent salts, and about 0.1 to 2.0 percent ash. The pH of the retentate generally may range from about 6.0 to about 7.0. In one embodiment, the milk substrate is subjected to UF/DF techniques to produce an about 3× to about 8× (preferably about 5× to 6×) milk concentrate retentate product.

The resultant retentate from step 103, including, for example, milk fat, protein, a controlled amount of lactose, minerals, and vitamins, is directed to a mix tank at step 105. The retentate from step 103 is mixed with the concentrated milk fat and cream processed in step 101. Additionally, several ingredients are added to the products from steps 101 and 103 including, in one example, sodium citrate and yeast extract, providing a fermentation premix. In another example, salt and water may be added in addition to sodium citrate and yeast extract. Sodium citrate is added as a substrate for microorganisms to convert into flavor compounds. Yeast extract is added to provide a source of molecular nitrogen, amino acids, and co-factors. Salt may be added as a flavor ingredient. Water may be added to control the pH and/or moisture level of the mixture. In one embodiment wherein skim milk is utilized, the mixture may comprise the following composition: cream 15 to 35 percent, water 10 to 30 percent, salt 0.1 to 2.0 percent, sodium citrate 0.1 to 1.0 percent, yeast extract 0.01 to 0.20 percent, concentrated milk fat 5 to 15 percent, and concentrated skim milk 35 to 55 percent. In another embodiment wherein whole milk is utilized, the mixture may comprise the following composition: cream 5 to 25 percent, water 10 to 30 percent, salt 0.5 to 2.0 percent, yeast extract 0.01 to 0.20 percent, and concentrated whole milk 55 to 75 percent.

Varying amounts of sodium citrate, yeast extract, salt, and water may be added depending on the desired fermentation products. Also, there are ingredients that may be used interchangeably with sodium citrate, such as, for example citric acid and edible salts thereof (e.g., sodium citrate, ammonium citrate, etc.). Similarly, other compounds which contain molecular nitrogen and/or amino acids and/or co-factors may be used in lieu of yeast extract, such as, for example, corn steep liquor and protein hydrosylates. Also, salt as a flavor additive may not be added to the mixture at all. This may particularly be the case in the production of low sodium foods. In one example, all of the ingredients are mixed together for approximately 5 to 15 minutes. However, any amount of time sufficient to mix the ingredients together may also be used. Other additives known or useful in the cheesemaking arts optionally can be added as desired, especially to the extent that they do not adversely affect development and retention of the unique flavoring system described herein. Such optional additives include, for example, preservatives, colorings, flavorings, emulsifiers, stabilizers, or mixtures thereof. Also, if desired, vegetable oil or other non-dairy fat may be added to form a portion of the fat content of the cream cheese product that is prepared by the process. Product texture modifiers, such as functionalized whey protein, also optionally may be included.

In another embodiment, step 103 may be excluded from the process. In this case, sodium citrate, yeast extract, salt, and water are mixed directly with the product of step 101 in the mix tank at step 105. This embodiment may be useful in the production of a fresh cheese composition containing an average amount of fat with a high flavor profile. Processes incorporating step 103 may be useful for the production of lower fat fresh cheese products with an enhanced flavor profile.

At step 107 the mixture is heated to approximately 50 degrees C. for approximately 16 seconds to melt the milk fat contained in the mixture. However, varying temperatures and times useful for liquefying the milk fat may be used. The heated mixture from step 107 is homogenized at step 109. Following homogenization, the mixture is pasteurized at step 111. In one example, the mixture is pasteurized by heating the mixture to 74 degrees C., holding the mixture at 74 degrees C. for 16 seconds and, finally, cooled to less than 30 degrees C. However, any pasteurization process may be substituted for the pasteurization process detailed here. After pasteurization, the mixture is directed into a fermentor at step 113. The fermentation vessel preferentially includes mixing capabilities to ensure contract between the cultures and substrate materials. A bacterial culture cocktail is added to the mixture inside the vessel to start fermentation. The culture cocktail is a mixture of lactose fermenting and flavor producing bacteria. These cultures may be provided in a frozen concentrated form known as Direct Vat Set (DVS) or as an active pre-culture grown the previous day which is known as Bulk Set (BS). The preferred method is to utilize the DVS culture system. The lactose fermenting cultures are generally of the species *Lactococcus cremoris* and *Lactococcus lactis*, and the like as well as combinations thereof. The lactose fermenting cultures produce lactic acid, as well as other organic acids and flavor compounds, to lower the pH from about 6.5 to about 4.7. The flavor producing bacterial are generally of the species *Lactococcus lactis* ssp. *diacetylactis* and *Leuconostoc cremoris*, and the like as well as combinations thereof. The flavor producing cultures have the ability to produce diacetyl, acetoin, and other flavor compounds from citrate, citric acid, or derivatives thereof. Additionally, the fermentation process increases the amount of lactones produced in the initial heating step by 30 to 85 percent. Any suitable culture of these types may be used, but they are preferably pre-tested and selected on the basis of producing high levels of flavor. Most preferentially they contain a mutation in the gene for acetolactate decarboxylase. These cultures are each added at about 0.1 to 0.01 percent.

The fermenting mixture is maintained under a pressure of about 1 to 5 psig. The fermentation temperature is controlled to about 26 degrees C. In one embodiment, fermentation may be divided into two phases. Phase 1 is conducted without aeration for about 12 hours until the pH is about 4.7. In another embodiment, phase 1 is conducted without aeration until the pH is about 5.4 or higher, regardless of elapsed time. Phase 2 begins with sterile air added at about 1 to 5 scfm (square cubic feet per minute). In another embodiment, fermentation is a single phase process wherein the mixture is aerated for approximately 40 hours. Aeration can be effected chemically or mechanically. Catalase can be introduced which liberates oxygen from hydrogen peroxide. Air or oxygen gas also may be introduced into the reaction mixture, such via a diffusion plate or an in-line sparger. The dissolved oxygen (DO) is continuously monitored throughout the fermentation cycle. DO is typically about 100 percent at the beginning of the fermentation cycle, but decreases as the flavor producing reactions consume oxygen. Phase 2 of the fermentation is continued for about 28 hours. The total fermentation time is about 40 hours, or until the flavor reactions are complete. Sorbic acid or potassium sorbate may be added as a preservative.

Following fermentation, the mixture is directed to a heat exchanger at step 115 for deactivation of the cultures. The mixture is first heated to a high temperature, such as 74 degrees C., and held for 16 seconds to inactivate bacteria surviving from the fermentation step. Following deactivation, the mixture is cooled to 20 degrees C. Variations of the deactivation step may be substituted. Generally the mixture should be subjected to a high enough temperature for enough time to inactivate surviving bacteria and then cooled to a reasonable working temperature.

Following deactivation at step 115 the mixture is directed to a storage container at step 117 to be further cooled, such as for example to about 5 degrees C. Finally, in step 119 the mixture is held at approximately 4 degrees C. The process illustrated in FIG. 1 can be employed as a batch, semi-continuous, or continuous process.

The biogenerated flavor composition described herein may be added to any food product for the purpose of enhancing flavor and/or organoleptic properties. However, in one embodiment, the biogenerated flavor composition may be added to fresh cheese or cream cheese products. In yet another embodiment, the biogenerated flavor composition may be added to low fat fresh cheese or cream cheese products. In another embodiment, the biogenerated flavor composition may be added to any dairy product.

Following processing as described hereinabove, the final mixture may contain the following flavor compounds diacetyl, acetoin, ethanol, 2-heptanone, 2-nonanone, 2-pentanone, acetone, 2-acetyl thiazoline, 2-methyl-3-methyl thiolfurane, g-hexalactone, g-octalactone, g-decalactone, g-dodecalactone, 6-dodecene-g-lactone, delta-hexalactone, delta-octalactone, delta-decalactone, delta-dodecalactone, and delta-tetradecalactone.

The flavor level of the cream cheese product can be judged organoleptically and/or can be estimated through analytical measurements (e.g., via gas chromatography), such as pH, titratable acidity, and concentration of lactones, free fatty acids, amino acids, or other metabolites known to be associated with a given cheese flavor profile.

Figure 2:
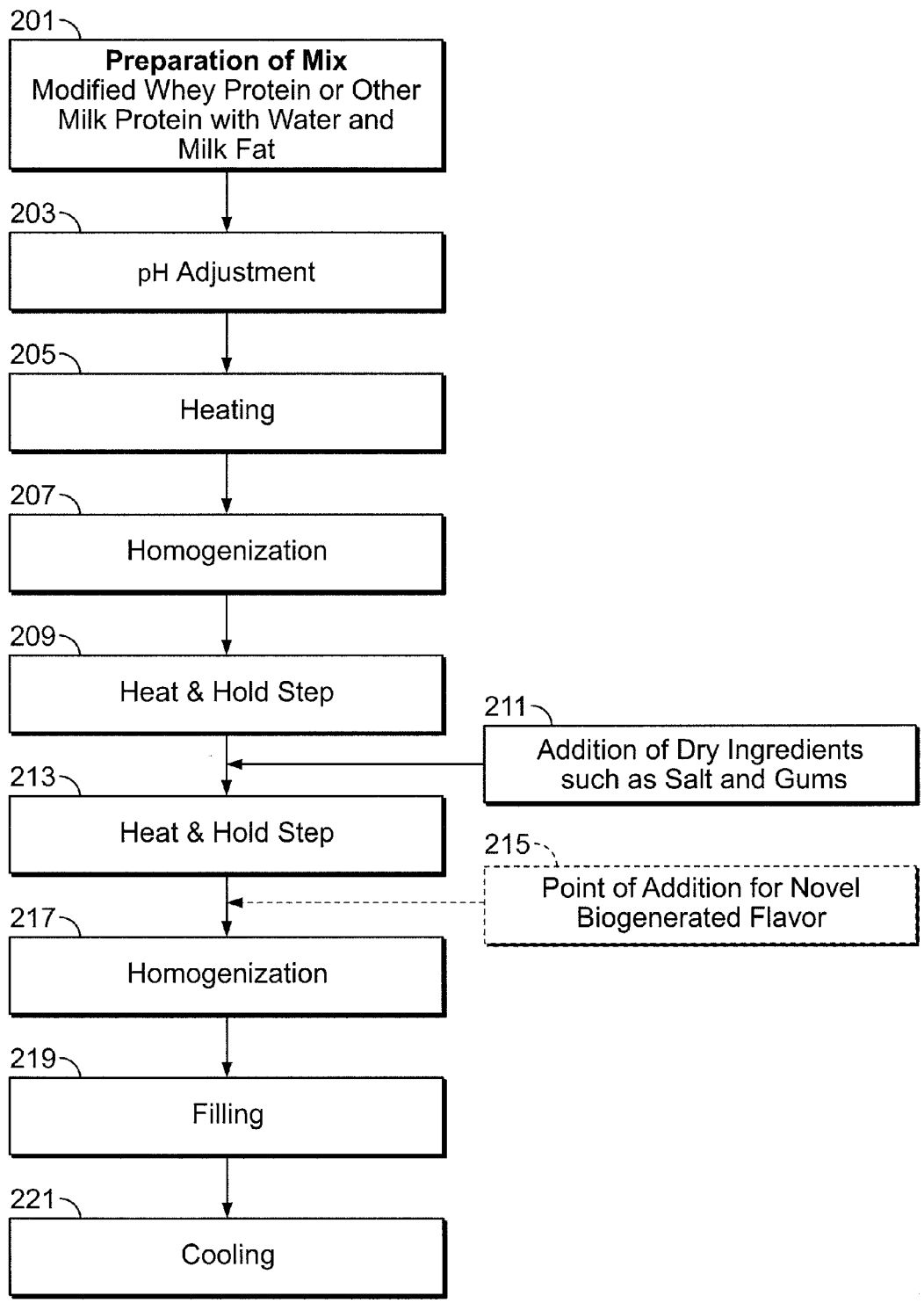
FIG. 2 provides a schematic flow diagram for a one day method for making a cream cheese base and incorporating a biogenerated flavor composition therein in an embodiment of the invention.

Turning now to FIG. 2, a schematic flow diagram for a one day method for making a cream cheese base and incorporating a biogenerated flavor composition therein is provided. This method of making cream cheese is performed without a culture step or a separation step.

At step 201 a mix is prepared by adding water, milk fat and either modified whey protein or other milk proteins. At step 203, the mixture prepared in step 201 is standardized to a pH of 4.9. Then, at step 205, the mixture is heated to 140 degrees F. At step 207 the mixture is homogenized at 5000/500 psi. The homogenized mixture is then heated to 200 degrees F. and held for approximately 10 minutes at step 209. At step 211 dry ingredients such as, but not limited to, salt, gums, vitamins, calcium, and maltodextrin are added to the cream cheese mixture. The mixture is then heated to 180 degree F. and held for 10 minutes at step 213. Then, at step 215 about 1 to 10 percent, and preferably 4 percent, of the biogenerated flavor composition is added to the cream cheese mixture. The cream cheese mixture and biogenerated flavor composition are homogenized at 5000/500 psi step 217, packaged at step 219, and cooled at step 221. The final fat concentration of the cream cheese product containing the biogenerated flavor composition may be less than about 20 percent, particularly about 1 to about 10 percent fat, and more particularly about 4 percent to about 7 percent fat. However, in alternate embodiments, the flavor composition may be added to full fat dairy bases yielding a higher fat concentration.

Figure 3:
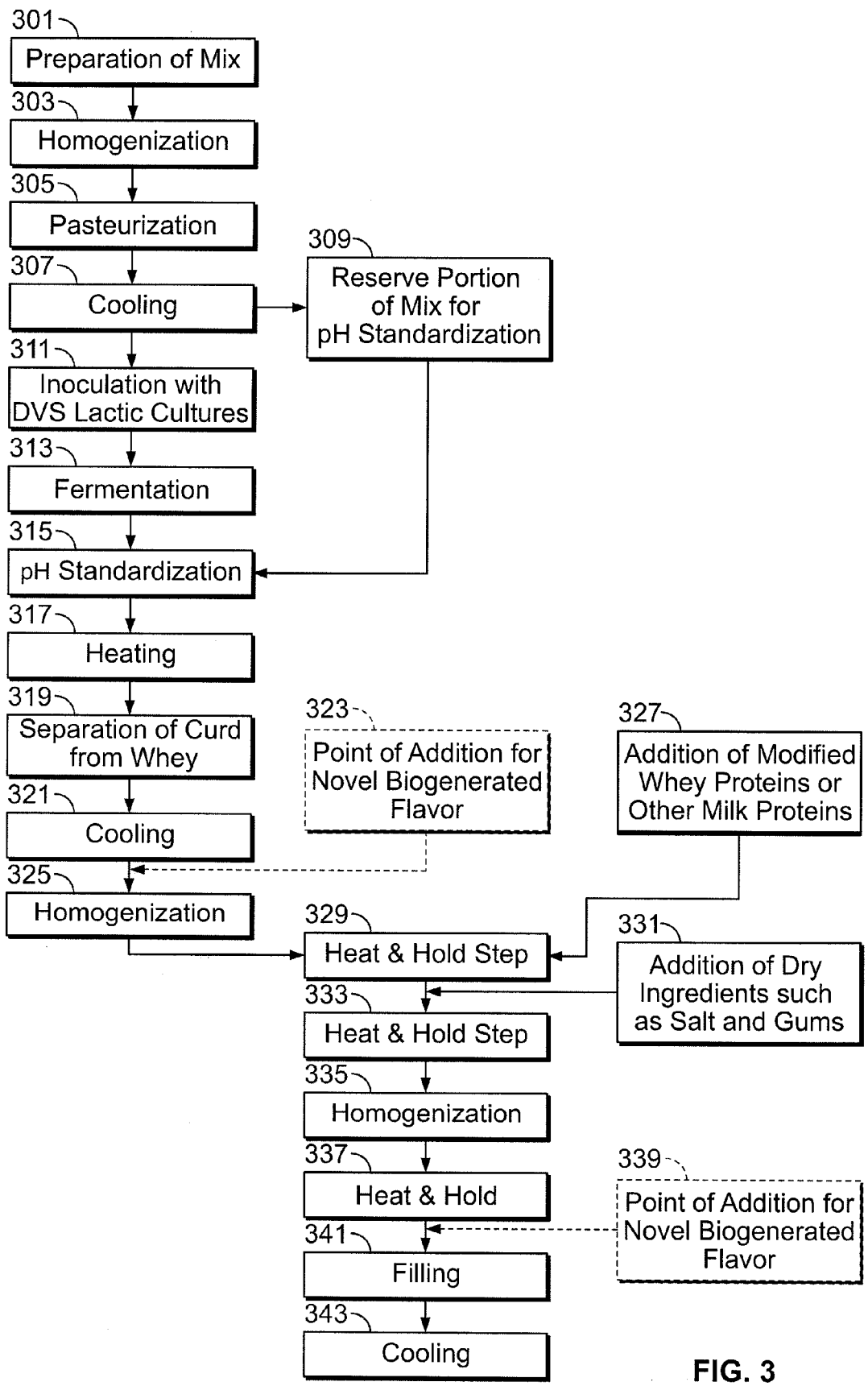
FIG. 3 provides a schematic flow diagram for a two day method for making a cream cheese base and incorporating a biogenerated flavor composition therein in an embodiment of the invention.

Turning now to FIG. 3, a schematic flow diagram for a two day method for making a cream cheese base and incorporating a biogenerated flavor composition therein is provided.

At step 301 a mix is prepared by adding milk and cream adjusted to a specified fat content, preferably between about 1.5 to 2.5 percent fat. Then, the mixture is homogenized at step 303, pasteurized at step 305, and cooled at step 307. At step 309, a portion of the mixture, preferably about 15 percent, is placed in a cooler for standardization. The remaining mixture is inoculated with DVS lactic cultures at step 311. Next, at step 313, the mixture ferments in the presence of the lactic cultures for approximately 18 to 24 hours at a temperature of about 70 to 75 degrees F. until the pH of about 4.35 to 4.60 is reached. At step 315, the fermented mixture prepared in step 313 is standardized with the mixture set aside in step 309 to a pH of about 4.70 to 4.80. The standardized mixture is then heated to about 115 degrees F. at step 317. Next, at step 319 the mixture is subjected to a membrane process, preferably ultrafiltration, to concentrate the retentate to approximately 23 percent solids. In another embodiment, a centrifugal separator may be used to concentrate the curd. The separated curd is then cooled to a temperature less than 60 degrees F. at step 321. Then, at step 323 biogenerated flavor composition may be added to the cream cheese mixture and homogenized at step 325. The mixture of step 323 (with or without biogenerated flavor composition) is combined with modified whey proteins or other milk proteins at step 327. The cream cheese composition is then heated to 125 degrees F. for 5 to 10 minutes at step 329. At step 331 dry ingredients such as, but not limited to, salt, gums, vitamins, calcium, and maltodextrin are added to the cream cheese mixture. At step 333 the composition is then heated to 125 F. for 30 minutes followed by an increase in temperature of 155 degrees F. and homogenization at 5075/725 psi at step 335. Next, at step 337, the cream cheese is heated to 180 degrees F. and recirculated for 30 minutes to build texture. At step 339 a biogenerated flavor composition may be partially or wholly added to the cream cheese mixture, depending on whether a biogenerated flavor composition was added at step 323. The cream cheese mixture and biogenerated flavor composition are packaged at step 341 and cooled at step 343. The final fat concentration of the cream cheese product containing the biogenerated flavor composition may be less than about 20 percent, particularly about 1 to about 10 percent fat, and more particularly about 4 percent to about 7 percent fat. However, in alternate embodiments, the flavor composition may be added to full fat dairy bases yielding a higher fat concentration.

Further descriptions of the production of cream cheese products, and in particular low-fat cream cheese products with enhanced texture may be found in a co-pending application filed on the same date, Sep. 30, 2005 identified by Attorney Docket No. 77361, which is incorporated herein by reference.

The following examples describe and illustrate certain processes and products of the invention. These examples are intended to be merely illustrative of the invention, and not limiting thereof in either scope or spirit. Variations of the materials, conditions, and processes described in these examples can be used. Unless otherwise noted, all percentages are by weight.

EXAMPLE 1

1.0—Preparation of Low-Fat Cream Cheese Using Biogenerated Flavor System.

1.0—Preparation of Low Fat Cream Cheese Base: A 7% fat cream cheese composition was produced by mixing 38.96 lbs. WPC 80 (Leprino Cheese), 33.9 lbs. dry whey and 327.14 lbs. water (acidified to pH 3.35 with an 18% concentration of phosphoric acid), heated to 200 degrees Fahrenheit (F.) and held for 6 minutes to form a whey mix. Next, 78.34 lbs. whey mix was blended with 18.16 lbs. cream and the pH was adjusted to 4.9 using sodium hydroxide to yield a cream cheese mix. The cream cheese mix was heated to 140 degrees F. and homogenized at 5000/500 psi. The homogenized mix was heated to 200 degrees F. and held for 10 minutes. Then, 64.334 lbs. cream cheese mix was blended with 0.035 lbs. sorbic acid, 0.049 lbs. xanthan gum, 0.267 lbs. carob gum, 1.469 lbs. maltodextrin, 0.629 lbs. tricalcium phosphate, and 0.417 lbs. salt. The mix was heated to 180 degrees F. and held for 10 minutes.

1.2—Preparation of Lactones: A cream composition comprising 194.21 lbs. of cream and 31.94 lbs. of concentrated milk fat having a composition of 42.00% fat, 53.80% moisture, 1.80% protein, and 3.1% lactose was heated to 88 degrees C. and held for 60 minutes. Following the initial heating step, the heated composition was found to have the following flavor compounds:

| Creamy Flavor Compounds | |
|---|---|
| g-hexalactone | 5 PPB |
| g-decalactone | 33 PPB |
| g-dodecalactone | 321 PPB |
| 6-dodecene-g-lactone | 119 PPB |
| Delta-hexalactone | 114 PPB |
| Delta-octalactone | 134 PPB |
| Delta-decalactone | 1114 PPB |
| Delta-dodecalactone | 2445 PPB |
| Delta-tetradecalactone | 2808 PPB |

1.3—Further Processing of Biogenerated Flavor Composition: 332.86 lbs. of concentrated skim milk was subjected to ultrafiltration and diafiltration such that the resulting retentate contained 0.20% fat, 18.50% protein, 76.65% moisture, 0.30% salt, and 1.20% lactose. The heated cream composition and the skim milk retentate were mixed in a Breddo mixer with 2.25 lbs. sodium citrate, 0.75 lbs. yeast extract, 6.1 lbs. salt, and 140.4 lbs. water. The mixture was heated to 50 degrees C., homogenized, and pasteurized. Pasteurization included heating the mixture to 74 degrees C., holding the mixture at 74 degrees C. for 16 seconds, and cooling to 30 degrees C. The pasteurized mixture was then fermented for 40 hours in a two phase process. A DVS culture containing *Lactococcus cremoris, Lactococcus lactis, Lactococcus lactis* spp. *diacetylactis*, and *Leuconostoc cremoris* (Chr Hansen Laboratories) was added to the fermentation vessel, where the initial concentration of the DVS culture was 0.01% of the total mixture volume. Phase 1 of the fermentation was conducted without aeration for 12 hours. Phase 2 was conducted with sterile air aeration for 28 hours. The temperature of the fermentation vessel was kept at approximately 26 degrees C. through out phase 1 and phase 2 of the fermentation cycle. The mixture was then directed to a heat exchanger and heat treated to 74 degrees C., held for 16 seconds, and cooled to 20 degrees C. The mixture was then directed to a barrel and further cooled to 5 degrees C. The final product was held at 4 degrees C. until use.

The final mixture had a composition profile as shown below:

| | |
|---|---|
| Citric acid | <0.01% |
| Fat | 18.12% |
| Moisture | 68.30% |
| Protein | 7.90% |
| Lactose | <0.01% |
| Salt | 0.90% |
| pH | 5.31 |

The final mixture contained the following flavor compounds:

| Cultured-Fermented Flavor Compounds | |
|---|---|
| Diacetyl | 16 PPM |
| Acetoin | 328 PPM |
| Ethanol | 96 PPM |
| 2-Heptanone | 1 PPM |

-continued

| | |
|---|---|
| 2-Nonanone | 1 PPM |
| 2-Pentanone | <1 PPM |
| Acetone | 1 PPM |
| Creamy Flavor Compounds | |
| g-hexalactone | <5 PPB |
| g-octalactone | 13 PPB |
| g-decalactone | 75 PPB |
| g-dodecalactone | 496 PPB |
| 6-dodecene-g-lactone | 273 PPB |
| Delta-hexalactone | 177 PPB |
| Delta-octalactone | 189 PPB |
| Delta-decalactone | 1755 PPB |
| Delta-dodecalactone | 3604 PPB |
| Delta-tetradecalactone | 6522 PPB |

2.3—Incorporation of Biogenerated flavor with 7% Fat Cream Cheese. Finally, 2.8 lbs. of the biogenerated flavor as produced in step 1.2 and 1.3 above was mixed with the cream cheese as produced in step 1.1 above.

EXAMPLE 2

2.0—Preparation of Low-Fat Cream Cheese Using Biogenerated Flavor System.

2.1—Preparation of Low Fat Cream Cheese Base: A 7% fat cream cheese composition was produced by mixing 38.96 lbs. WPC 80 (Leprino Cheese), 33.9 lbs. dry whey and 327.14 lbs. water (acidified to pH 3.35 with an 18% concentration of phosphoric acid), heated to 200 degrees Fahrenheit (F.) and held for 6 minutes to form a whey mix. Next, 78.34 lbs. whey mix was blended with 18.16 lbs. cream and the pH was adjusted to 4.9 using sodium hydroxide to yield a cream cheese mix. The cream cheese mix was heated to 140 degrees F. and homogenized at 5000/500 psi. The homogenized mix was heated to 200 degrees F. and held for 10 minutes. Then, 64.334 lbs. cream cheese mix was blended with 0.035 lbs. sorbic acid, 0.049 lbs. xanthan gum, 0.267 lbs. carob gum, 1.469 lbs. maltodextrin, 0.629 lbs. tricalcium phosphate, and 0.417 lbs. salt. The mix was heated to 180 degrees F. and held for 10 minutes.

2.2—Preparation of Biogenerated Flavor Composition: 102 lbs. of a cream composition containing 42.00% fat, 53.80% moisture, 1.80% protein, and 3.1% lactose was heated to 88 degrees C. and held for 60 minutes. 482.25 lbs. of whole milk was subjected to ultrafiltration and diafiltration such that the resulting retentate contained 18.50% fat, 13.00% protein, 65.00% moisture, 0.30% salt, and 1.20% lactose. The heated cream composition and the whole milk retentate were mixed together in a Breddo mixer with 2.25 lbs. sodium citrate, 0.75 lbs. yeast extract, 6.75 lbs. salt, and 156 lbs. water. The mixture was heated to 50 degrees C., homogenized, and pasteurized. Pasteurization included heating the mixture to 74 degrees C., holding the mixture at 74 degrees C. for 16 seconds, and cooling to 30 degrees C. The pasteurized mixture was then fermented for 40 hours in a two phase fermentation process. A DVS culture containing *Lactococcus cremoris*, *Lactococcus lactis, Lactococcus lactis* spp. *diacetylactis*, and *Leuconostoc cremois* (Chr Hansen Laboratories) was added to the fermentation vessel, where the initial concentration of the DVS culture was 0.01% of the total mixture volume. Phase 1 of the fermentation was conducted without aeration for 12 hours. Phase 2 was conducted with sterile air aeration for 28 hours. The temperature of the fermentation vessel was kept at approximately 26 degrees C. through out phase 1 and phase 2 of the fermentation cycle. The mixture was then directed to a heat exchanger and heat treated to 74 degrees C., held for 16 seconds, and cooled to 20 degrees C. The mixture was then directed to a barrel and further cooled to 5 degrees C. The final flavor product was held at 4 degrees C. until use.

The biogenerated flavor composition had a composition profile as shown below:

| | |
|---|---|
| Citric acid | <0.01% |
| Fat | 16.59% |
| Moisture | 70.60% |
| Protein | 10.40% |
| Lactose | <0.01% |
| Salt | 0.90% |
| pH | 5.44 |

The final biogenerated flavor composition contained the following flavor compounds:

| | |
|---|---|
| Cultured-Fermented Flavor Compounds | |
| Diacetyl | 30 PPM |
| Acetoin | 612 PPM |
| Ethanol | 17 PPM |
| 2-Heptanone | <1 PPM |
| 2-Nonanone | <1 PPM |
| 2-Pentanone | 1 PPM |
| Acetone | 1 PPM |
| Creamy Flavor Compounds | |
| g-octalactone | 4 PPB |
| g-decalactone | 28 PPB |
| g-dodecalactone | 302 PPB |
| 6-dodecene-g-lactone | 176 PPB |
| delta-octalactone | 161 PPB |
| delta-decalactone | 1344 PPB |
| delta-dodecalactone | 2778 PPB |

2.3—Incorporation of Biogenerated flavor with 7% Fat Cream Cheese. Finally, 2.8 lbs. of the biogenerated flavor as produced in step 2.2 above was mixed with the 7% cream cheese as produced in step 2.1 above.

EXAMPLE 3

Preparation of Cream Cheese Base. A 7% fat cream cheese was prepared by mixing 59.5 lbs. WPC50 (First District Association), 10.40 lbs. dry whey and 330.10 lbs. water was acidified to pH 3.35 with 18% concentration phosphoric acid, heated to 200 degrees F. and held for 6 minutes to form a whey mix. After heating, the 62.28 lbs. whey mix was blended with 11.11 lbs. cream and the pH was adjusted to 4.9 using sodium hydroxide to yield a cream cheese mix. The cream cheese mix was heated to 140 degrees F. and homogenized at 5000/500 psi. The homogenized mix was heated to 200 degrees F. and held for 10 minutes. Then, 64.334 lbs. cream cheese mix was blended with 0.035 lbs. sorbic acid, 0.049 lbs. xanthan gum, 0.267 lbs. carob gum, 1.469 lbs. maltodextrin, 0.629 lbs. tricalcium phosphate, and 0.417 lbs. salt. The mix was heated to 180 degrees F. and held for 10 minutes. Finally, 2.0 lbs. of the biogenerated flavor was added to 48.0 lbs of the cream cheese mix. The cream cheese mix was homogenized at 5000/500 psi and packaged.

EXAMPLE 4

Preparation of Cream Cheese Base. A 5% fat cream cheese was prepared by mixing skim milk and cream to yield approximately 3000 lbs. of mix at 1.7% fat. The mix was then homogenized, pasteurized and cooled. Approximately 400 lbs. of mix was set aside for day 2 pH standardization. Direct set lactic acid cultures were added to 2600 lbs. of the mix and incubated for 18 hours at 70 degrees F. The pH of the incubated mix was 4.53 on day 2. The pH was standardized to 4.73 with the addition of the 400 lbs. unfermented mix. The mix was then concentrated using UF and the retentate was collected at 23.1 percent solids. Next, 48.6 lbs. retentate was mixed with 40 lbs. of functionalized whey protein (made in accordance with patent application No. EP 04027965.5), 0.8 lbs. salt, 0.45 lbs. carob gum, and 0.15 lbs. carrageenan gum to form cream cheese. The cream cheese was heat to 131 degrees F. and homogenized at 5000/100 psi. The cream cheese was then heated to 183 degrees F. and recirculated for 45 minutes to build texture. 10 lbs. of biogenerated flavor was added to the cream cheese.

EXAMPLE 5

Preparation of Cream Cheese Base. A 5% fat cream cheese was prepared by mixing skim milk and cream to yield approximately 1500 Kg. of mix at 1.6% fat. The mix was then homogenized, pasteurized and cooled. Approximately 225 Kg of the mix was set aside for day 2 pH standardization. Direct set lactic acid cultures were added to 1275 Kg of the mix and incubated for 18 hours at 24 degrees C. The pH of the incubated mix was 4.39 on day 2. The pH was standardized to 4.62 with the addition of the 225 Kg unfermented mix. The mix was then concentrated using a UF and the retentate was collected at 23.8 percent solids. The retentate was then cooled to 9 degrees C. and homogenized at 400/80 bar. Next, 40 Kg of functionalized whey protein (made in accordance with patent application No. EP 04027965.5) was homogenized at 390/70 bar and mixed with 51.7 Kg retentate form cream cheese. The cream cheese was heated to 52 degrees C. and held for 10 minutes. Ingredients such as 0.8 Kg salt, 0.35 Kg carob gum and 0.15 Kg carrageenan gum were added to the cream cheese. The cream cheese was then held at 52 degrees C. for 30 minutes, heated to 70 degrees C., homogenized at 350/50 bar and recirculated at 81 degrees C. for approximately 30 minutes to build texture. Finally, 7 Kg of biogenerated flavor was added to the cream cheese and packaged.

EXAMPLE 6

Preparation of Cream Cheese Base. A 7% fat cream cheese was prepared by mixing 10.42 lbs. MPC 70 (Fonterra), 1.6 lbs. dry whey, 12.32 lbs. cream and 48.21 lbs. in a tank and the pH was adjusted to 4.9 using lactic acid to yield a cream cheese mix. The cream cheese mix was heated to 140 degrees F. and homogenized at 5000/500 psi. Then, 45.34 lbs. of the cream cheese mix was blended with 0.025 lbs. sorbic acid, 0.035 lbs. xanthan gum, 0.190 lbs. carob gum, 1.5 lbs. maltodextrin, 0.450 lbs. tricalcium phosphate, and 0.460 lbs. salt. The mix was heated to 180 degrees F. and held for 10 minutes. Finally, 2.0 lbs. of the biogenerated flavor was added to the cream cheese mix. The cream cheese mix was homogenized at 5000/500 psi and packaged.

All references cited herein are incorporated by reference.

What is claimed is:

1. A process for making a flavor composition, comprising the steps of:
    (a) heating a dairy product comprising 15 to 35 percent cream and 5 to 15 percent concentrated milk fat to a temperature in the range of 60 degrees C. to 140 degrees C. for an amount of time between 15 minutes and 24 hours to induce the production of thermally induced flavor compounds;
    (b) mixing the heated dairy product from step (a) with a salt citrate and a nitrogen source; and
    (c) fermenting the mixture from step (b) with lactose fermenting bacteria and flavor producing lactic acid bacteria in a two phase fermentation cycle comprising fermentation phase one and fermentation phase two, wherein phase one is conducted without aeration and phase two is conducted with aeration.

2. The process of claim 1, wherein the temperature is about 84 to about 92 degrees C.

3. The process of claim 1, wherein the time is about 55 to about 65 minutes.

4. The process of claim 1, wherein the thermally induced flavor compounds produced comprise at least one of lactones, acetyls, or furans.

5. The process of claim 4 wherein the lactones produced comprise at least one of g-hexalactone, g-octalactone, g-decalactone, g-dodecalactone, 6-dodecene-g-lactone, delta-hexalactone, delta-octalactone, delta-decalactone, delta-dodecalactone, or delta-tetradecalactone.

6. The process of claim 1, wherein the salt citrate comprises sodium citrate.

7. The process of claim 1, wherein the nitrogen source comprises yeast extract.

8. The process of claim 1, wherein the lactose fermenting bacteria are selected from the group consisting of *Lactococcus cremoris*, *Lactococcus lactis*, and mixtures thereof.

9. The process of claim 1, wherein the flavor producing bacteria are selected from the group consisting of *Lactococcus lactis* ssp *diacetylactis*, *Leuconostoc cremoris*, and mixtures thereof.

10. The process of claim 1 wherein the method further comprises combining the heated dairy product of step (a) with a milk concentrate having a lactose concentration of less than about 2 percent prior to step (c), wherein the milk skim milk concentrate.

11. A method for preparing a low-fat cream cheese fermentation product, the method comprising the steps of:
    (a) heating a dairy product comprising 15 to 35 percent cream and 5 to 15 percent concentrated milk fat to a temperature in the range of 60 degrees C. to 95 degrees C. for an amount of time between 15 minutes and 24 hours to induce the production of thermally induced flavor compounds to provide a heated dairy product;
    (b) mixing the heated dairy product with an edible citrate salt and/or corresponding acid, an edible nitrogen source, and optionally a milk concentrate having a lactose concentration less than about 2 percent, to provide a dairy mixture;
    (c) fermenting the dairy mixture with lactose fermenting bacteria and flavor producing lactic acid bacteria in a two phase fermentation cycle comprising fermentation phase one and fermentation phase two, wherein phase one is conducted without aeration and phase two is conducted with aeration; and
    (d) mixing the fermented dairy mixture of step (c) with cream cheese base to provide the low-fat cream cheese fermentation product, wherein the low-fat cream cheese fermentation product contains less than about 20 percent fat.

\* \* \* \* \*

UNITED STATES PATENT AND TRADEMARK OFFICE
CERTIFICATE OF CORRECTION

PATENT NO. : 7,674,489 B2 Page 1 of 1
APPLICATION NO. : 11/241645
DATED : March 9, 2010
INVENTOR(S) : James W. Moran et al.

It is certified that error appears in the above-identified patent and that said Letters Patent is hereby corrected as shown below:

In the Claims:
Column 14, approximately line 38, in claim 10, before "skim" insert -- concentrate is --.

Signed and Sealed this

Twelfth Day of October, 2010

David J. Kappos
*Director of the United States Patent and Trademark Office*